US011555957B2

(12) United States Patent
Mukasa

(10) Patent No.: US 11,555,957 B2
(45) Date of Patent: Jan. 17, 2023

(54) MULTICORE FIBER AND METHOD OF MANUFACTURE THEREFOR

(71) Applicant: FURUKAWA ELECTRIC CO., LTD., Tokyo (JP)

(72) Inventor: Kazunori Mukasa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/931,527

(22) Filed: Jul. 17, 2020

(65) Prior Publication Data

US 2020/0348463 A1 Nov. 5, 2020

Related U.S. Application Data

(63) Continuation of application No. PCT/JP2019/002446, filed on Jan. 25, 2019.

(30) Foreign Application Priority Data

Jan. 25, 2018 (JP) .............................. JP2018-010235

(51) Int. Cl.
*G02B 6/02* (2006.01)
*C03B 37/012* (2006.01)

(52) U.S. Cl.
CPC .... *G02B 6/02042* (2013.01); *C03B 37/01214* (2013.01); *G02B 6/02342* (2013.01)

(58) Field of Classification Search
CPC ................................................ G02B 6/02042
See application file for complete search history.

(56) References Cited

U.S. PATENT DOCUMENTS

| 2013/0016949 | A1 | 1/2013 | Yao et al. |
| 2013/0209106 | A1 | 8/2013 | Mukasa |
| 2014/0010507 | A1 | 1/2014 | Sasaki et al. |
| 2014/0334789 | A1 | 11/2014 | Matsuo et al. |
| 2015/0043878 | A1 | 2/2015 | Chen |
| 2015/0049878 | A1 | 2/2015 | Jingming |

(Continued)

FOREIGN PATENT DOCUMENTS

| JP | 2011-180243 A | 9/2011 |
| JP | 2012-203035 A | 10/2012 |

(Continued)

OTHER PUBLICATIONS

International Search Report dated Mar. 5, 2019 in PCT/JP2019/002446 filed on Jan. 25, 2019, 2 pages.

(Continued)

*Primary Examiner* — Omar R Rojas
(74) *Attorney, Agent, or Firm* — Oblon, McClelland, Maier & Neustadt, L.L.P.

(57) ABSTRACT

A method of manufacturing a multicore fiber includes: an initial-preform forming process of forming an initial preform by arranging in an array a plurality of core rods each including a core portion and a cladding portion formed around outer periphery of the core portion; and an optical fiber manufacturing process of manufacturing an optical fiber from the initial preform. Further, the core rods include a plurality of holes, and the core rods are arranged in a manner that one hole is arranged between two core portion adjacent to each other in the initial-preform forming process.

6 Claims, 9 Drawing Sheets

(56) References Cited

U.S. PATENT DOCUMENTS

| | | |
|---|---|---|
| 2015/0307387 A1 | 10/2015 | Fagan et al. |
| 2015/0316714 A1 | 11/2015 | Tsuchida et al. |
| 2019/0033513 A1 | 1/2019 | Sasaki et al. |

FOREIGN PATENT DOCUMENTS

| | | | |
|---|---|---|---|
| JP | 2012-222613 A | | 11/2012 |
| JP | 2012-230156 A | | 11/2012 |
| JP | 2013-020074 A | | 1/2013 |
| JP | 2013-167861 A | | 8/2013 |
| JP | 2013-195800 A | | 9/2013 |
| JP | 2014-098832 A | | 5/2014 |
| JP | 2015045705 A | * | 3/2015 |
| JP | 2015-121642 A | | 7/2015 |
| JP | 2017-513798 A | | 6/2017 |
| WO | WO 2012/118132 A1 | | 9/2012 |
| WO | 2012/172997 A1 | | 12/2012 |
| WO | WO 2017/159385 A1 | | 9/2017 |

OTHER PUBLICATIONS

Saitoh et al., "Multi-Core Hole-Assisted Fibers for High Core Density Space Division Multiplexing", OECC 2010, 7C2-1, 2010, 2 pages.

Yao et al., "Reduction of Crosstalk by Hole-Walled Multi-Core Fibers", OFC 2012, paper OM2D.5., 2012, 3 pages.

Extended European Search Report dated Sep. 3, 2021 in European Patent Application No. 19744165.2, 9 pages.

Office Action dated Sep. 6, 2022 in corresponding Japanese Patent Application No. 2019-567184, along with an English translation.

* cited by examiner

MULTICORE FIBER AND METHOD OF MANUFACTURE THEREFOR

CROSS-REFERENCE TO RELATED APPLICATION(S)

This application is a continuation of International Application No. PCT/JP2019/002446, filed on Jan. 25, 2019 which claims the benefit of priority of the prior Japanese Patent Application No. 2018-010235, filed on Jan. 25, 2018, the entire contents of which are incorporated herein by reference.

BACKGROUND

The present disclosure relates to a multicore fiber and a method of manufacture therefor.

A multicore fiber that is an optical fiber having a plurality of core portions has been known. In a multicore fiber, a technology that, by providing holes at appropriate locations around core portions for which the refractive index is controlled by adding a dopant such as germanium (Ge) or fluorine (F), improves crosstalk (XT) characteristics of light between the core portions has been disclosed (K. Saitoh et al., "Multi-core hole-assisted fibers for high core density space division multiplexing", OECC 2010, 7C2-1 (2010)). In addition, a technology that, by selectively providing a hole structure between core portions, suppresses XT efficiently has been disclosed (B. Yao et al., "Reduction of Crosstalk by Hole-Walled Multi-Core Fiber" OFC 2012, paper OM2D.5 (2012)).
Citation List

SUMMARY

There is a need for providing a multicore fiber for which crosstalk between core portions is suppressed with a simple structure, and a method of manufacture therefor.

According to an embodiment, a multicore fiber includes: a plurality of core portions; and a cladding portion formed around an outer periphery of the core portions. Further, the cladding portion includes a hole that is arranged between two core portions adjacent to each other, and a distance between the hole and one of the two core portions differs from a distance between the hole and another of the two core portions.

According to an embodiment, a method of manufacturing a multicore fiber includes: an initial-preform forming process of forming an initial preform by arranging in an array a plurality of core rods each including a core portion and a cladding portion formed around an outer periphery of the core portion; and an optical fiber manufacturing process of manufacturing an optical fiber using the initial preform. Further, the core rods include a plurality of holes, and the core rods are arranged in a manner that one hole is arranged between two core portion adjacent to each other in the initial-preform forming process.

According to an embodiment, a method of manufacturing a multicore fiber includes: an initial-preform forming process of forming an initial preform by arranging a plurality of core rods each including a core portion and a cladding portion formed around an outer periphery of the core portion such that each core rod is adjacent to N core rods where N is an integer greater than two; and an optical fiber manufacturing process of manufacturing an optical fiber using the initial preform. Further, each of the core rods includes N or less holes, and the core rods are arranged such that one hole is positioned between two core portions adjacent to each other in the initial preform forming process.

According to another embodiment of the multicore fiber, the plurality of core portions includes a central core portion and multiple peripheral core portions arranged around the central core portion such that each of the peripheral core portions is adjacent to the central core portion and approximately a same distance from the central core portion. The holes include multiple holes of equal number to the multiple peripheral core portions, wherein each hole is provided between the central core portion and a respective one of the peripheral core portions. A first half of the number of multiple holes are equally spaced at a first distance from the central core portion, and a second half of the number of the multiple holes are equally spaced at a second distance from the central core portion, the first distance being different from the second distance.

DETAILED DESCRIPTION

Figure 1:
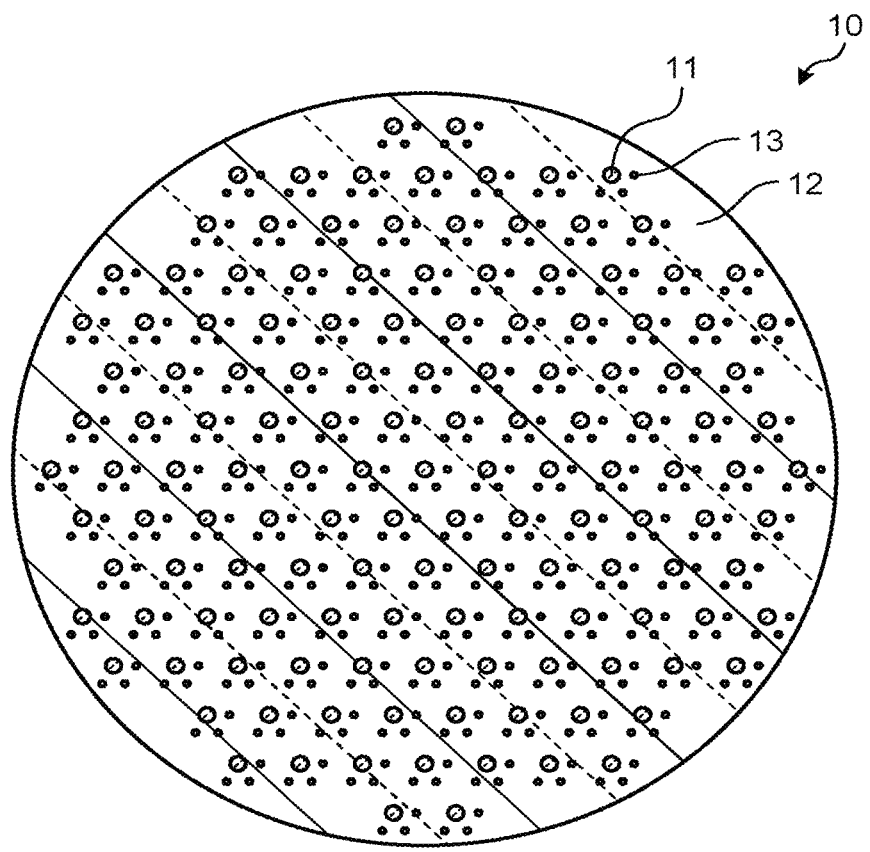
FIG. 1 is a schematic cross-sectional view of a multicore fiber according to a first embodiment.

In the technology of K. Saitoh et al., "Multi-core hole-assisted fibers for high core density space division multiplexing", OECC 2010, 7C2-1 (2010), by preparing a plurality of core rods that have a core portion and a cladding portion and for which the cladding portion is formed with holes arranged in a regular hexagonal shape with the core portion as the center, and by arranging those core rods in a regular hexagonal shape and at the center position of the regular hexagonal shape, a multicore fiber is manufactured by a known stack-and-draw method. However, in this manufacturing method, in one core rod, six holes are formed for one core portion. Thus, because there is a need to control, for a large number of holes that is six times the number of core portions, the hole diameter by flowing gas and the like in order to prevent the holes from being blocked in the drawing process, the process becomes complex for performing delicate control. Due to such complicated control, desired crosstalk may be not obtained in the manufactured multicore fiber.

Meanwhile, in the technology of B. Yao et al., "Reduction of Crosstalk by Hole-Walled Multi-Core Fiber" OFC 2012, paper OM2D.5 (2012), because the hole structure is arranged in the middle of the adjacent core portions, it is difficult to apply a stack-and-draw method in manufacturing the multicore fiber. That is, when a stack-and-draw method is applied, there is a need to use a complex technology such as arranging hollow capillaries for forming holes between the core rods. As a result, the positional accuracy of the holes is degraded, and the desired crosstalk may be not obtained in the manufactured multicore fiber. Meanwhile, in the technology of B. Yao et al., "Reduction of Crosstalk by Hole-Walled Multi-Core Fiber" OFC 2012, paper OM2D.5 (2012), it is also conceivable to form the hole structure by using a known drilling method. However, in this case, there is a need to form the hole structure after forming a solid multicore preform, and that may complicate the process.

While referring to the accompanying drawings, the following describes exemplary embodiments of the present disclosure in detail. The disclosure, however, is not intended to be limited by the embodiments described in the following. In each of the drawings, identical or corresponding constituent elements are denoted by identical reference signs as appropriate. In this specification, the cutoff wavelength means the cable cutoff wavelength defined in ITU-T (International Telecommunication Union) G.650.1. Other terms not specifically defined in this specification follow the definitions and measurement methods in ITU-T G.650.1.

First Embodiment

FIG. 1 is a schematic cross-sectional view of a multicore fiber according to a first embodiment. A multicore fiber 10 includes a plurality of core portions 11, and a cladding portion 12 that is formed around the outer periphery of the core portions 11. In the first embodiment, the number of core portions 11 is 139. The core portions 11 are arranged in a triangular lattice shape. That is, three core portions 11 are arranged in a regular triangular shape. This arrangement can be said to be a shape in which one core portion 11 is arranged at the center of six core portions 11 arranged in a regular hexagonal shape (that is, a hexagonal close-packed shape).

The core portions 11 and the cladding portion 12 are all made of quartz-based glass. The cladding portion 12 has a refractive index lower than the refractive index of the core portion 11. For example, the core portion 11 is made of quartz glass to which Ge that is a dopant to increase the refractive index has been added. Meanwhile, the cladding portion 12 is made of pure quartz glass that contains no dopant for refractive index adjustment. The refractive index profile of the core portion 11 is, for example, a step index type, but can be a W type, a W-seg type, a trench type or the like and is not particularly limited. In the present embodiment, it is assumed that the refractive index profile of each core portion 11 is the same.

Figure 2:
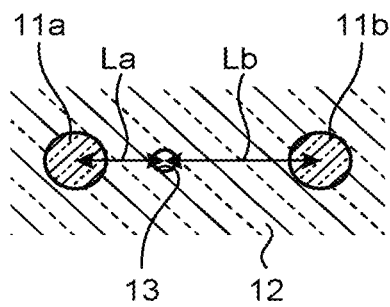
FIG. 2 is a diagram for explaining a positional relation between core portions and a hole.

The cladding portion 12 has a plurality of holes 13. The holes 13 are formed in the cladding portion 12 such that an angle formed by two adjacent holes 13 around a core portion 11 is 60 degrees. FIG. 2 is a diagram for explaining a positional relation between core portions 11 and the hole 13. Assuming that two adjacent core portions out of the core portions 11 are core portions 11a and 11b, the cladding portion 12 has one hole 13 that is arranged between the two adjacent core portions 11a and 11b. The core portion 11 adjacent to a specific core portion 11 means a core portion for which the distance to the relevant specific core portion 11 is the shortest and, in the multicore fiber 10, the maximum number thereof is six.

Distances La and Lb from each of the two core portions 11a and 11b to the hole 13 differ from each other. As just described, because the distances La and Lb differ from each other, the influences that the hole 13 exerts on optical confinement due to the respective refractive index profiles of the two core portions 11a and 11b also differ from each other. As a result, even if the two core portions 11a and 11b have the same refractive index profile, due to the influence of the hole 13, the effective refractive indexes differ from each other. Thus, the two core portions 11a and 11b can be regarded as core portions for which the refractive index profile differs from each other (heterogeneous core portions). As a result, the crosstalk of light between the two core portions 11a and 11b is smaller than the crosstalk when no hole 13 is present or when the hole 13 is filled with the material of the cladding portion 12. The crosstalk of light between the two core portions 11a and 11b is smaller than the crosstalk of the case where the distances La and Lb are equal.

That is, in the multicore fiber 10, one hole 13 is shared with the two core portions 11a and 11b, and the crosstalk is suppressed with a simple structure.

In the multicore fiber 10 having such a large number of core portions 11, it is desirable that the holes 13 be appropriately arranged such that the crosstalk that occurs among one core portion 11 and the core portions 11 other than that is suppressed to a desirable value. In this case, it should be noted that, because the cable cutoff wavelength (λcc) in the core portion 11 becomes longer as the number of holes 13 increases, the hole diameter and the hole arrangement are designed such that λcc is shorter than the wavelength used. For example, the core portion 11 arranged closest to the central axis of the multicore fiber 10 has a large number of other core portions 11 that are affected by crosstalk and also has a large number of holes 13 that affect λcc. Thus, it is desirable that the hole diameter and the hole arrangement be designed such that, even in such a core portion 11 close to the central axis, λcc is shorter than the wavelength used and such that single-mode propagation can be achieved. It is preferable that λcc be, for example, 1530 nm or less because single-mode propagation is achieved when a wavelength band of 1.55 μm is set as the wavelength used and it is more preferable that λcc be 1500 nm or less.

Manufacturing Method

Next, a method of manufacturing the multicore fiber 10 will be described from a known stacking method as an example.

First, core rods are fabricated by from a known vapor-phase axial deposition (VAD) method or a chemical vapor deposition (CVD) method (plasma CVD or modified CVD), three holes are formed in the core rod by a drilling method, and the core rods are stretched by flame stretching, drawing, or the like while maintaining the hole structure.

Figure 3:
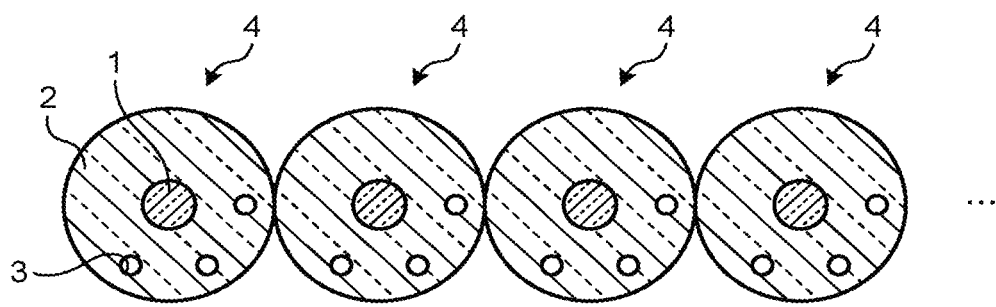
FIG. 3 is a diagram for explaining a method of manufacturing the multicore fiber illustrated in FIG. 1.
Figure 4:
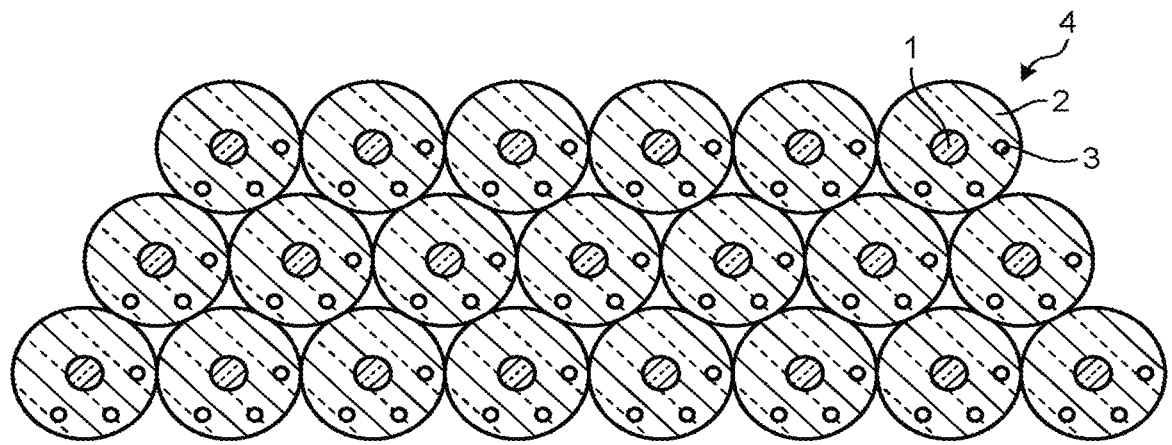
FIG. 4 is a diagram for explaining the method of manufacturing the multicore fiber illustrated in FIG. 1.

Subsequently, the core rods are stacked. For example, FIG. 3 and FIG. 4 illustrate core rods 4 including a core portion 1 and a cladding portion 2 formed around the outer periphery the core portion, and the cladding portion 2 has three holes 3. In this case, the three holes 3 are formed in the cladding portion 2 so that an angle formed by two adjacent holes 3 around the core portion 1 is 60 degrees. The core portion 1 and the cladding portion 2 are made of the same materials as those of the core portion 11 and the cladding portion 12, respectively, of the multicore fiber 10.

Initial-Preform Forming Process

As illustrated in FIG. 3 and FIG. 4, by preparing a plurality of core rods 4, the core rods 4 are arranged side-by-side in an array and are further stacked. At this time, the rotation position around the axis of each core rod 4 is adjusted so that one hole 3 is arranged between two adjacent core portions 1. By having such a process of arranging each core rod 4 in this way, one hole 13 is shared with two core portions 1 and 1. Thus, the number of holes to be formed is smaller than that of the case where the holes are formed in the arrangement of a regular hexagonal shape in one core rod as in K. Saitoh et "Multi-core hole-assisted fibers for high core density space division multiplexing", OECC 2010, 7C2-1 (2010), and specifically, may be a half. As a result, the complexity in manufacturing is suppressed.

Figure 5:
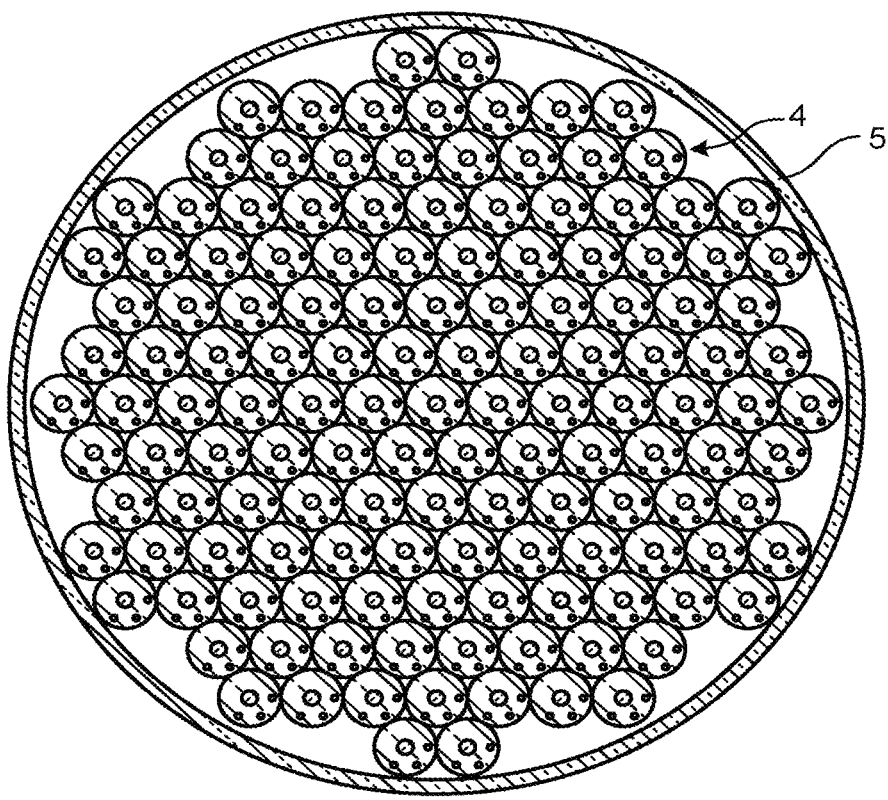
FIG. 5 is a diagram for explaining the method of manufacturing the multicore fiber illustrated in FIG. 1.

The stacking of the core rods 4 may, as illustrated in FIG. 5, be made by inserting the core rods 4 in sequence in a glass tube 5 made of the same material as that of the cladding portion 2 or may be made by stacking and bundling the core rods 4 and by inserting it into the glass tube 5. As a result, as illustrated in FIG. 5, the initial preform in which the core rods 4 are arranged so as to form a hexagonal close-packed shape is formed.

Optical-Fiber Manufacturing Process

The multicore fiber 10 can be manufactured by drawing this initial preform under a condition by which the internal stacking structure is maintained and deforms in a similar shape. In the present manufacturing method, because the core rods 4 to be prepared can all be the same, the manufacture is easier.

Next, structural parameters of the multicore fiber 10 of the first embodiment will be described. The structural parameters can be determined appropriately by simulations, experiments, and the like. Although the following illustrates an example of optimization design, the structural parameters can be designed as appropriate according to the number of core portions, the purpose of the multicore fiber and the like, and are not limited to the following example.

Figure 6:
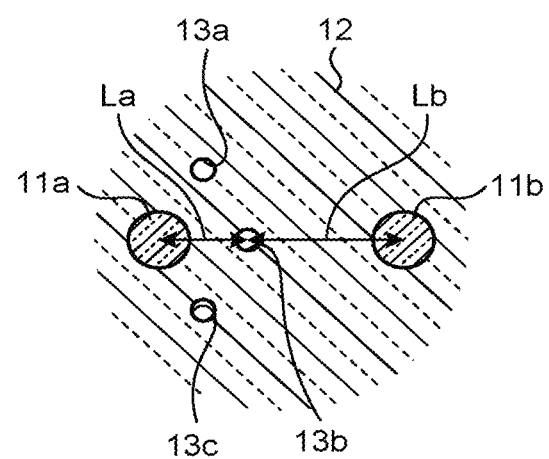
FIG. 6 is a diagram for explaining a calculation model.

FIG. 6 is a diagram for explaining a calculation model of the multicore fiber 10. The refractive index profiles of the core portions 11a and 11b that are adjacent core portions out of the core portions 11 are of a step-index type. Holes 13a, 13b, and 13c out of the holes 13 are arranged, in the cladding portion 12, such that an angle formed by two adjacent holes around the core portion 11a is 60 degrees.

Herein, when the number of core portions is large as in the multicore fiber 10, the outer diameter (cladding diameter) becomes thick, but the cladding diameter is preferably 500 µm or less in terms of handling. Meanwhile, in order to make the cladding diameter small, when the distance (pitch) between adjacent core portions is reduced, the crosstalk characteristics are degraded even if the holes are arranged. Consequently, calculations were made on several design examples and, giving consideration based on the result, the pitch was set to 32 µm. The pitch is La+Lb. Furthermore, when the position of the hole is too close to the outer periphery of the cladding portion, cracks may occur on the glass constituting the multicore fiber. Meanwhile, when the hole is too close to the core portion, optical characteristics such as mode field diameter (MFD) are deteriorated significantly. To that end, in consideration of the balance between the occurrence of cracks and the degradation in optical characteristics, the position of the hole 13b was set to 12 µm from the core portion 11a (=La) and 20 µm from the core portion 11b (=Lb). In addition, the relative refractive-index difference between the core portions 11a and 11b with respect to the cladding portion 12 was set to 0.37% that equivalent to a standard single-mode fiber (SMF) in optical communications, and the core diameter was set to 10 µm that is slightly larger than the standard SMF.

Figure 7:
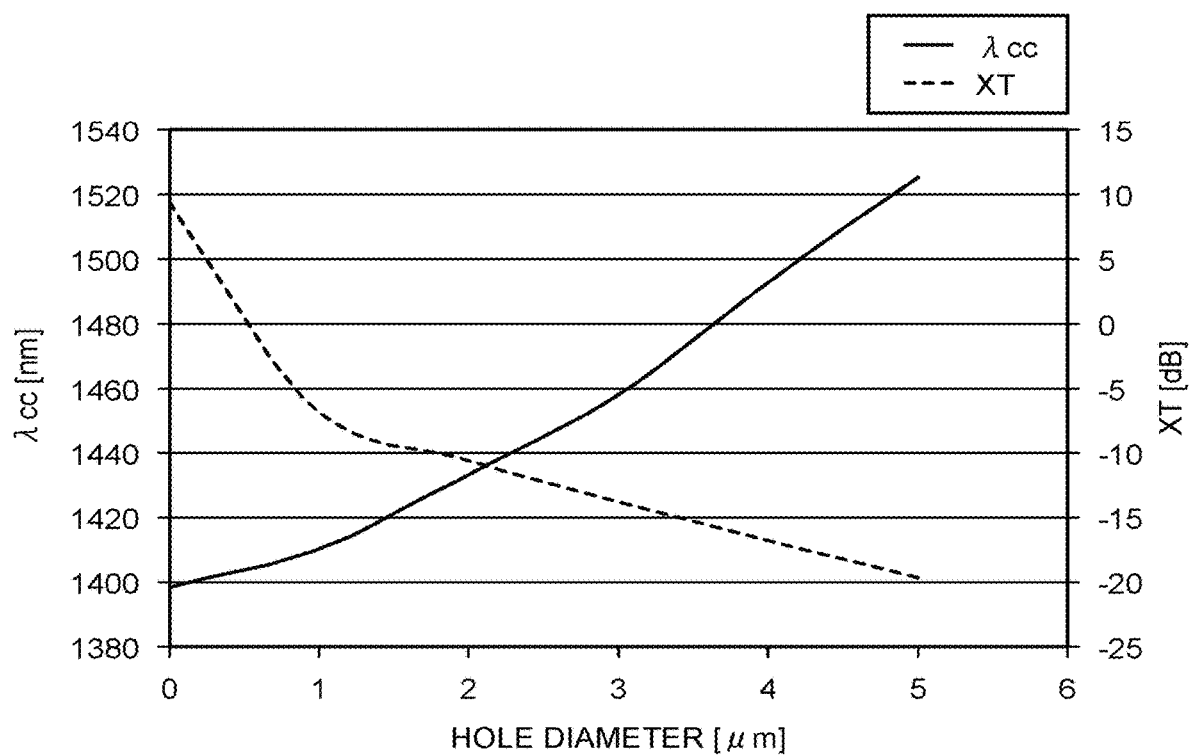
FIG. 7 is a graph indicating an example of optical characteristics.

By setting the structural parameters to the above-described numerical values, the optical characteristics of the multicore fiber 10 were calculated while varying the hole diameter of the hole 13. FIG. 7 is a graph indicating an example of the optical characteristics. In this case, the abscissa axis is the hole diameter. The left ordinate axis is λcc and is the value of the core portion 11 arranged closest to the central axis of the multicore fiber 10. The right ordinate axis is crosstalk (XT) and is the value taking into account the influence from one adjacent core portion. XT was calculated as a value per length of 100 km, with a wavelength of 1550 nm. From the result of FIG. 7, was confirmed that when the hole diameter is 4 µm, λcc is 1500 nm or less, XT is the lowest, and that is appropriate.

Table 1 indicates the optical characteristics of the multicore fiber 10 when the hole diameter is 4 µm. Aeff is an effective core cross-sectional area, and the bending loss is a value when the bending diameter is 20 mm. Aeff, MFD, and the bending loss are all values at a wavelength of 1550 nm. XT is the value of XT in FIG. 7.

TABLE 1

| Optical characteristics | Unit | Value |
| --- | --- | --- |
| λcc | nm | 1493 |
| MFD | µm | 10.01 |
| Aeff | µm$^2$ | 79.0 |
| Bending loss (20 mm) | dB/m | 0.24 |
| XT | dB | −16.8 |

As indicated in Table 1, XT was −15 dB or less. Furthermore, λcc also was 1500 nm or less, and MFD also was approximately 10 µm that is comparable to that of the standard SMF. In order to further improve XT, there is no problem even if the hole diameter is slightly expanded. However, because λcc gets larger than 1530 nm when the hole diameter is greater than 5 µm, it is desirable that the hole diameter be 5 µm or less.

For the core portion 11 closest to the outer periphery of the cladding portion 12, there is a need to set the cladding thickness to a predetermined thickness or more, in order to suppress leakage loss. Herein, the cladding thickness is the shortest distance between the core portion 11 (outermost core portion) closest to the outer periphery of the cladding portion 12 and the outer periphery of the cladding portion 12. This cladding thickness also affects the design of the glass tube 5, for example. Consequently, at the outermost core portion, when calculated the cladding thickness needed to suppress the leakage loss at a wavelength of 1550 nm to 0.001 dB/km or less, it was confirmed that the cladding thickness was 37.7 µm or more. Thus, for example, in the multicore fiber 10, when the cladding thickness is set to 42 µm, the cladding diameter is 468 µm and it was confirmed that the cladding diameter can be suppressed to 500 µm or less.

First Modification

Figure 8:
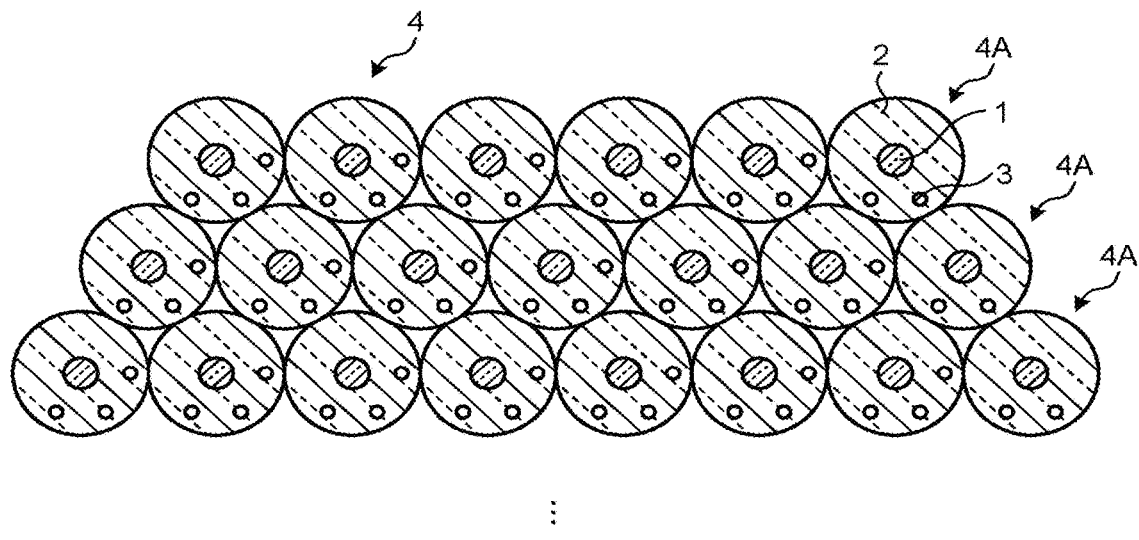
FIG. 8 is a diagram for explaining a first modification of the method of manufacturing the multicore fiber.

FIG. 8 is a diagram for explaining a first modification of the method of manufacturing the multicore fiber. In this first modification, in addition to the core rods 4 illustrated in FIG. 3, core rods 4A are used. The core rod 4A includes the core portion 1 and the cladding portion 2 formed around the outer periphery of the core portion, and the cladding portion 2 has two holes 3. In the core rod 4A, the angle formed by the two holes 3 around the core portion 1 is 60 degrees. Even when such core rods 4 and 4A are stacked in combination, by arranging in the glass tube the multiple core rods 4 and 4A such that the core rods are in a hexagonal close-packed shape and one hole 13 is positioned between two core portions 1, an initial preform can be formed. Then, by drawing this initial preform, a multicore fiber that has one hole arranged between each two adjacent core portions and for which distances from each of the two core portions to the hole differ from each other can be manufactured. In the case of the first modification, the number of holes 3 to be formed can be further reduced.

Second Modification

Figure 9:
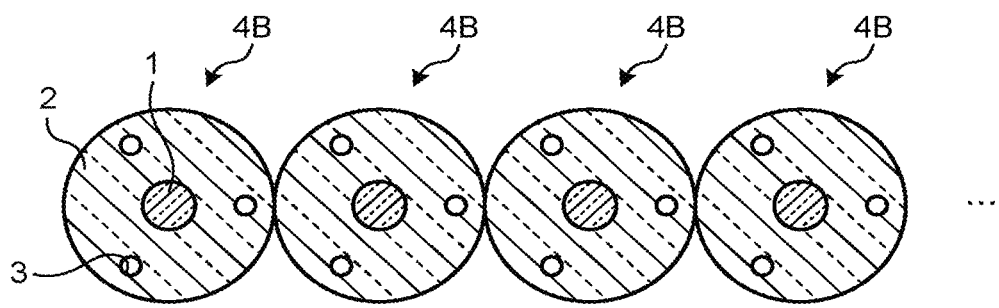
FIG. 9 is a diagram for explaining a second modification of the method of manufacturing the multicore fiber.
Figure 10:
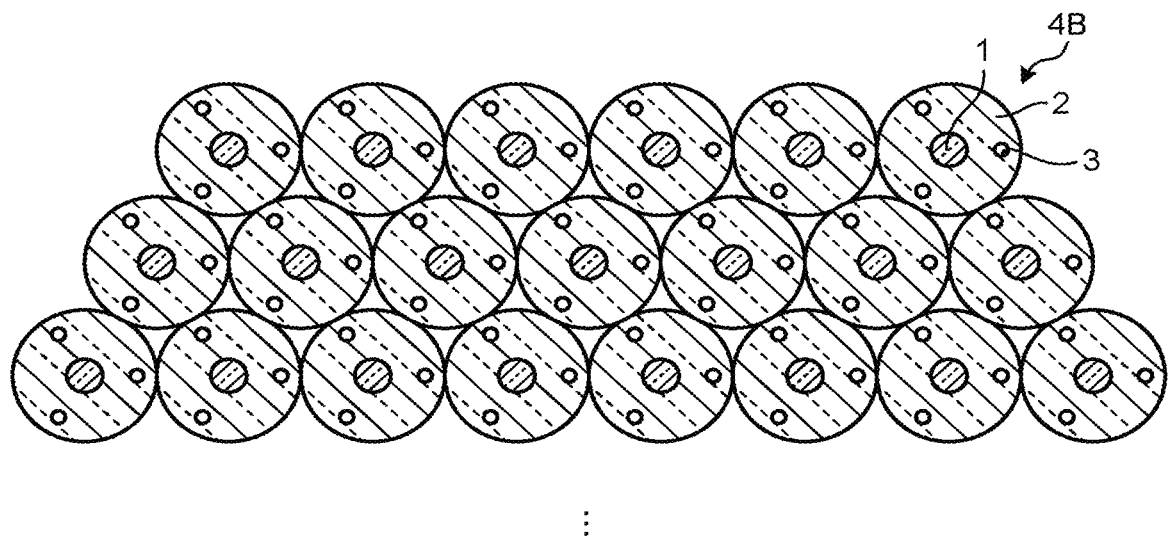
FIG. 10 is a diagram for explaining the second modification of the method of manufacturing the multicore fiber.

FIG. 9 and FIG. 10 are diagrams for explaining a second modification of the method of manufacturing the multicore fiber. In this second modification, core rods 4B are used. The core rod 4B includes the core portion 1 and the cladding portion 2 formed around the outer periphery of the core portion, and the cladding portion 2 has three holes 3. In the core rod 4B, the angle formed by the holes 3 around the core portion 1 is 120 degrees. Even when such core rods 4B are stacked, by arranging in the glass tube the multiple core rods 4B such that the core rods are in a hexagonal close-packed shape and one hole 13 is positioned between two core portions 1, an initial preform can be formed. Then, by drawing this initial preform, a multicore fiber that has one hole arranged between each two adjacent core portions and for which distances from each of the two core portions to the hole differ from each other can be manufactured. In the case of the second modification, because the core rods 4B to be prepared can all be the same, the manufacture is easier.

Third Modification

Figure 11:
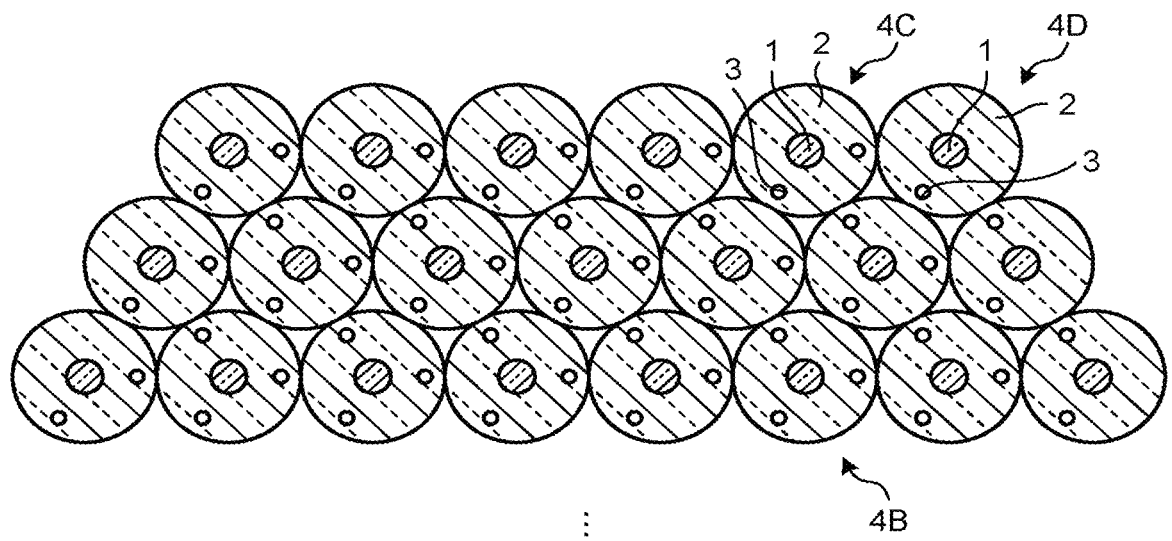
FIG. 11 is a diagram for explaining a third modification of the method of manufacturing the multicore fiber.

FIG. 11 is a diagram for explaining a third modification of the method of manufacturing the multicore fiber. In this third modification, in addition to the core rods 4B illustrated in FIG. 10, core rods 4C and 4D are used. The core rod 4C includes the core portion 1 and the cladding portion 2 formed around the outer periphery of the core portion, and the cladding portion 2 has two holes 3. In the core rod 4B, the angle formed by two holes 3 around the core portion 1 is 120 degrees. The core rod 4D includes the core portion 1 and the cladding portion 2 formed around the outer periphery of the core portion, and the cladding portion 2 has one hole 3. Even when such core rods 4B, 4C, and 4D are stacked in combination, by arranging in the glass tube the multiple core rods 4B, 4C, and 4D such that the core rods are in a hexagonal close-packed shape and one hole 13 is positioned between two core portions 1, an initial preform can be formed. Then, by drawing this initial preform, a multicore fiber that has one hole arranged between each two adjacent core portions and for which distances from each of the two core portions to the hole differ from each other can be manufactured. In the case of the third modification, the number of holes 3 to be formed can be further reduced.

Fourth Modification

Figure 12:
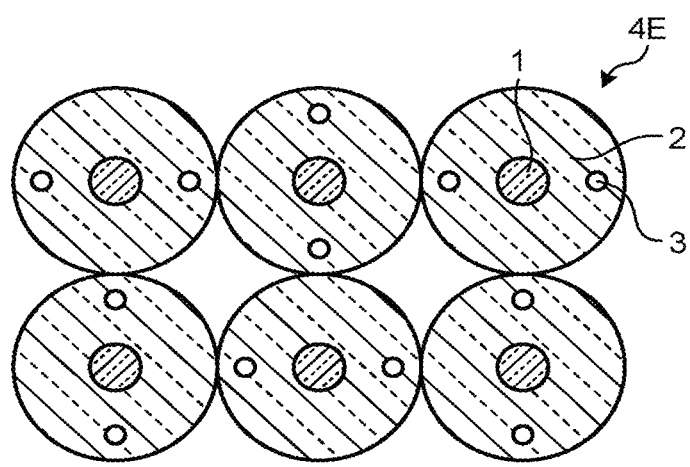
FIG. 12 is a diagram for explaining a fourth modification of the method of manufacturing the multicore fiber.

FIG. 12 is a diagram for explaining a fourth modification of the method of manufacturing the multicore fiber. In this fourth modification, core rods 4E are used. The core rod 4E includes the core portion 1 and the cladding portion 2 formed around the outer periphery of the core portion, and the cladding portion 2 has two holes 3. In the core rod 4E, the angle formed by the holes 3 around the core portion 1 is 180 degrees. By stacking such core rods 4E and by arranging in the glass tube the multiple core rods 4E such that the core rods are in a square lattice shape and one hole 13 is positioned between two core portions an initial preform can be formed. Then, by drawing this initial preform, a multicore fiber that includes a plurality of core portions arranged in a regular tetragon and has one hole arranged between each two adjacent core portions, and for which distances from each of the two core portions to the hole differ from each other can be manufactured.

Fifth Modification

Figure 13:
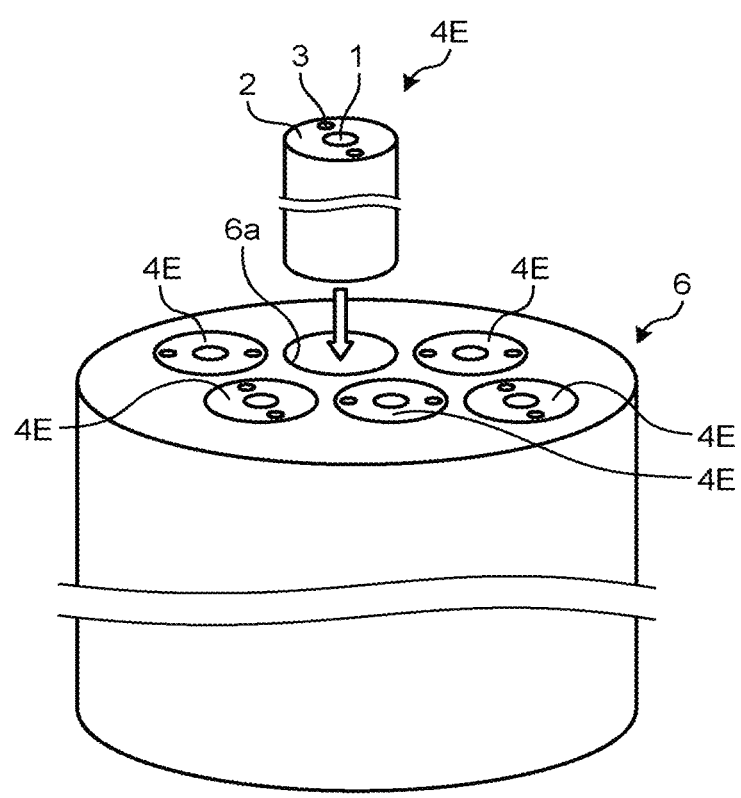
FIG. 13 is a diagram for explaining a fifth modification of the method of manufacturing the multicore fiber.

FIG. 13 is a diagram for explaining a fifth modification of the method of manufacturing the multicore fiber. In this fifth modification, although the core rods 4E are used, a drilling method but not the stacking method is used. That is, through-holes 6a extending in the axial direction are bored in a glass rod 6 by using a drill and the like, and the core rod 4E is inserted into each of the through-holes 6a. As a result, an initial preform for which a plurality of core rods 4E are arranged such that the core rods are in a square lattice shape and one hole 13 is positioned between two core portions 1 can be formed. Then, by drawing this initial preform, a multicore fiber that includes a plurality of core portions arranged in a square lattice shape and has one hole arranged between each two adjacent core portions, and for which distances from each of the two core portions to the hole differ from each other can be manufactured.

Second Embodiment

Next, a second embodiment of the present disclosure will be described. In the above-described first embodiment, the cutoff wavelength is shifted up to around 1500 nm, in consideration of the use in large-capacity communication. Meanwhile, considering the application to data center uses, it is desirable that a 1310 nm band can be used. Thus, optimization studies were conducted on a 91-core structure illustrated in FIG. 14 so that the cutoff wavelength is 1310 nm or less. In the case of data center uses, the distance to transmit is short relative to large-capacity communication uses. Consequently, calculations were made on several design examples and, giving consideration based on the result, the pitch was set to 25 μm. That is, the pitch of La+Lb illustrated in FIG. 2 was set to 25 μm. Furthermore, when the position of the hole is too close to the outer periphery of the cladding portion, cracks may occur on the glass constituting the multicore fiber. Meanwhile, when the hole is too close to the core portion, optical characteristics such as TMD are significantly deteriorated. To that end, in consideration of the balance between the occurrence of cracks and the degradation in optical characteristics, the position of the hole 13 was set to 10 μm from the core portion 11a (=La) and 15 μm from the core portion 11b (=Lb). As for the center core, the relative refractive-index difference was set to 0.37% that is similar to that of an SMF in the related art, and the core diameter was set to 8.7 μm so that the cutoff wavelength is 1310 nm or less even when the hole diameter is 4 μm. Then, in the hole arrangement illustrated in FIG. 2, the simulation was conducted while varying the hole diameter between 0 and 4 μm.

Figure 15:
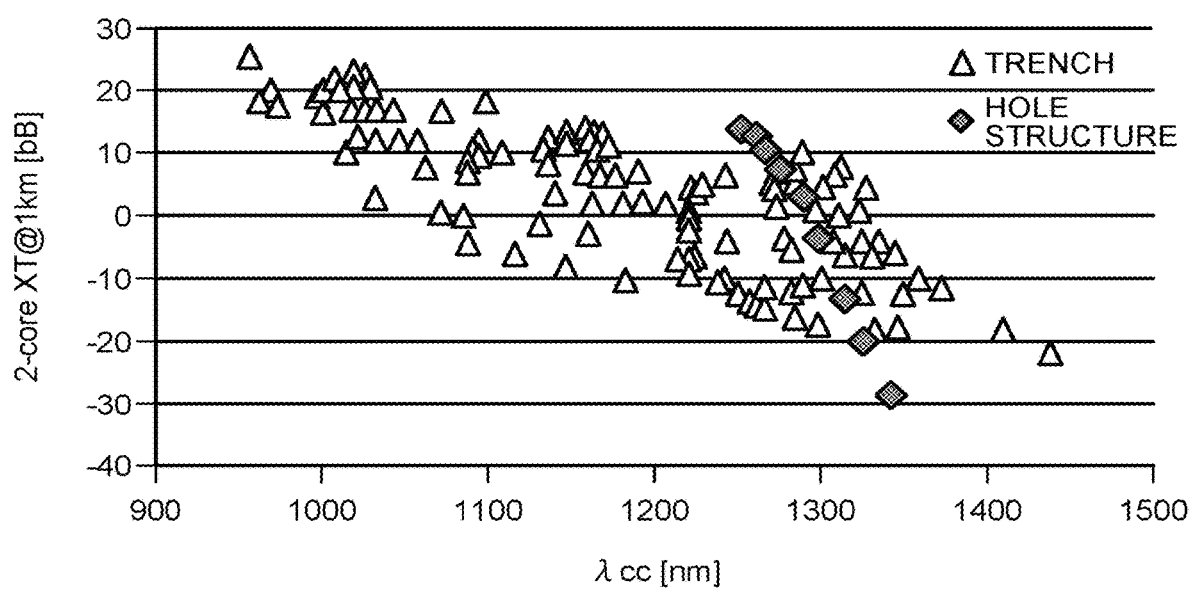
FIG. 15 is a graph indicating a calculation data group of a trench-type multicore fiber in the related art and a result of a crosstalk simulation in the second embodiment.

FIG. 15 indicates a calculation data group of a trench-type multicore fiber in the related art and the result of XT simulation in the second embodiment. As XT calculated at 1 km, the calculation was made on XT from the nearest core. From the result of the simulation, it was confirmed that, as compared with the trench-type multicore fiber, the use of a hole structure can significantly improve the relation of the trade-off between the cutoff wavelength and the XT characteristics.

Table 2 indicates the optical characteristics obtained when the hole diameter was set to 4 μm. In Table 2, "XT between adjacent cores" is a value in consideration of the influence from one adjacent core portion, and "total XT from peripheral cores" is a value in consideration of the influence from six adjacent core portions. From Table 2, it can be seen that XT between adjacent cores was suppressed to less than −25 dB per 1 km (−25 dB@1 km). Moreover, it can be seen that $\lambda c$ was suppressed to 1310 nm or less and it is possible to use the 1310 nm band. As for MFD also, it can be seen that MFD of more than 9 μm at 1550 nm (9 μm@1550 nm) that is equivalent to the SMF in the related art can be achieved.

For the core portion 11 closest to the outer periphery of the cladding portion 12, there is a need to set the cladding thickness to a predetermined thickness or more, in order to suppress leakage loss. Herein, the cladding thickness is the shortest distance between the core portion 11 (outermost core portion) closest to the outer periphery of the cladding portion 12 and the outer periphery of the cladding portion 12. This cladding thickness also affects the design of the glass tube 5, for example. Consequently, at the outermost core portion, when calculated the cladding thickness needed to suppress the leakage loss at a wavelength of 1550 nm to 0.001 dB/km or less, it was confirmed that the cladding thickness was 37.7 μm or more. Thus, for example, in the multicore fiber 10 of 91 cores, it was confirmed that when the cladding thickness is set to 40 μm, the cladding diameter is 330 μm and can be suppressed to 350 μm or less.

TABLE 2

| Optical characteristics | Unit | Value |
|---|---|---|
| $\lambda cc$ | nm | 1304 |
| MFD | μm | 9.22 |
| Aeff | μm² | 67.3 |
| Bending loss (20 mm) | dB/m | 5.1 |
| XT between adjacent cores | dB | −26.2 |
| Total XT from peripheral cores | dB | −18.4 |

Figure 14:
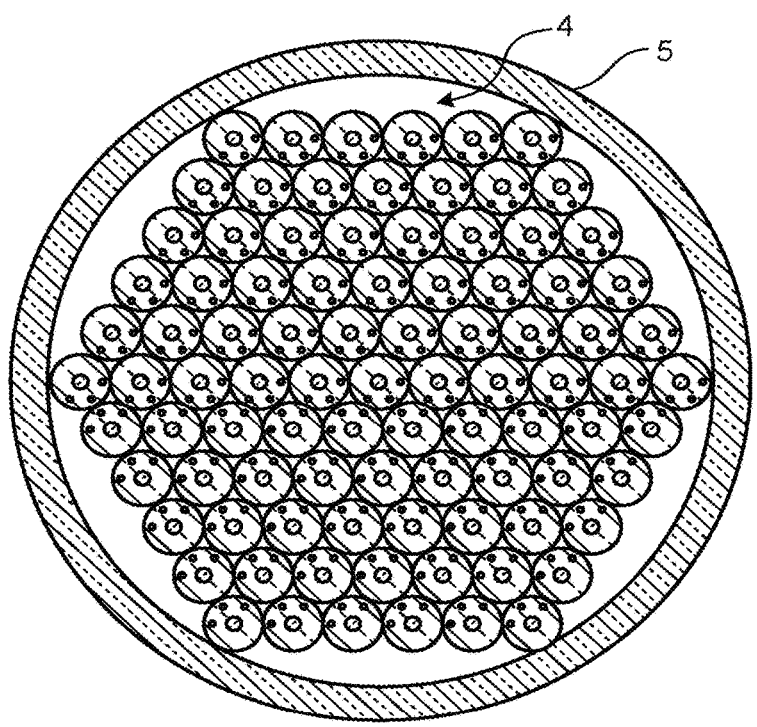
FIG. 14 is a schematic cross-sectional view of a multicore fiber according to a second embodiment.
Figure 16:
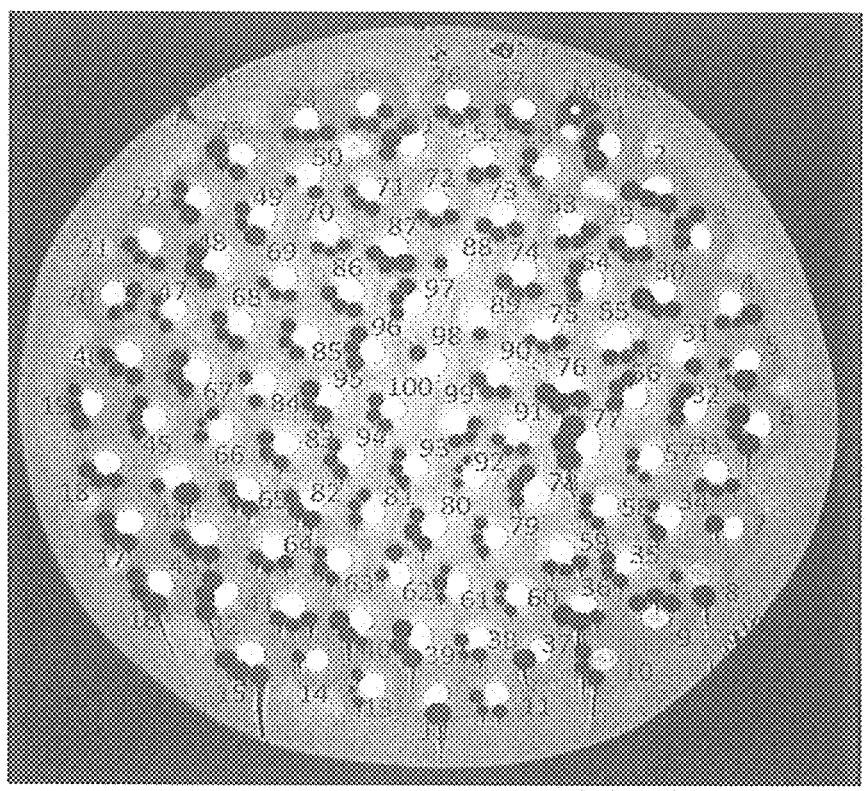
FIG. 16 is a schematic cross-sectional view of an optical fiber obtained by the method of manufacturing the multicore fiber in the second embodiment.

The inventor conducted prototype verification based on the foregoing simulation result. In the prototype verification in the second embodiment, the prototype was made based on the stacking method in the same way as that of the first embodiment. As illustrated in FIG. 14, in the case of an ideal structure, because there is a gap between the glass tube 5 and the core preform, the core preforms were also inserted in the gap, thereby resulting in the optical fiber of a 100-core structure. In the gap portion illustrated in FIG. 14, glass rods serving as markers were inserted. FIG. 16 illustrates an example of a cross-sectional structure of the optical fiber obtained by the manufacturing method in the second embodiment. The cladding diameter of the multicore fiber 10 illustrated in FIG. 16 is 322 μm. Although the cladding diameter of the multicore fiber 10 illustrated in FIG. 16 is slightly small relative to the target of 330 μm, a hole-type 100-core fiber was achieved. In the multicore fiber 10 illustrated in FIG. 16, it was confirmed that the average pitch of adjacent core portions 11 is 24.1 μm and is slightly small relative to the target of 25 μm. The core diameter was confirmed that, although there are variations of about 7 to 10 μm, a value close to the target of 8.7 μm as the average was obtained. Moreover, as for the hole diameter, it was confirmed that the center value was 4 to 5 μm and is close to the target of 4 μm.

Thus, the inventor conducted an evaluation of optical characteristics with the core for which the structure was relatively close to the target. Table 3 indicates the evaluation result of optical characteristics. From Table 3, although there are slight variations, as the optical characteristics, it can be seen that those close to the simulations are obtained.

TABLE 3

| Optical characteristics | Unit | Simulation | Core (100) | Core (93) | Core (80) | Core (61) | Core (38) | Core (11) |
|---|---|---|---|---|---|---|---|---|
| $\lambda cc$ | nm | 1304 | 1321 | 1300 | 1300 | 1357 | 1312 | 1312 |
| MFD | μm | 9.22 | 8.94 | 8.99 | 8.97 | 9.05 | 9.22 | 9.48 |
| Bending loss (20 mm) | dB/m | 5.1 | 1.0 | 3.2 | 0.5 | 2.7 | 2.0 | 1.1 |

The inventor further conducted XT measurement on the core (80) that is near the center and for which the cutoff wavelength is 1300 nm. Note that, for example, the core (80) indicates the 80 th core portion in the multicore fiber 10 illustrated in FIG. 16. XT was set to a value per length of 1 km. Table 4 indicates the result of XT measurement. In Table 4, for example, "80-61" indicates the combination of the core (80) and the core (61) as the adjacent core portions 11. From Table 4, in XT@1 km of the cores (80-93), the value is large from the relation of hole orientation, but as for the other values, it can be seen that the results substantially the same as those of the simulations are obtained.

TABLE 4

| Optical characteristics | Unit | Simulation | 80-61 | 80-62 | 80-81 | 80-93 | 80-92 | 80-79 |
|---|---|---|---|---|---|---|---|---|
| XT@1 km | dB | −26.2 | −25.9- | −27.0 | −23.4 | −5.9 | −20.2 | −27.8 |

According to the design and the manufacturing method in the second embodiment, it can be seen that the multicore fiber 10 having an extremely large number of core portions 11 can be achieved easily.

In the above-described embodiments, in the multicore fiber or the initial preform, a plurality of core portions are arranged in a hexagonal close-packed shape or a square lattice shape, and between each core portion and a core portion adjacent to the relevant core portion, one to three holes are arranged. However, the present disclosure is not limited thereto, and with N defined as an integer of three or more, the core portions may be arranged to form an N-gon, and between each core portion and a core portion adjacent to the relevant core portion, the holes of less than N pieces may be arranged. This makes the number of holes be less than N, resulting in a simple structure.

The present disclosure is not intended to be limited by the above-described embodiments. The disclosure also includes a configuration in which the above-described constituent elements are combined as appropriate. Further effects and modifications can be readily derived by those skilled in the art. Therefore, the broader aspects of the present disclosure are not limited to the above-described embodiments, and various modifications are possible.

INDUSTRIAL APPLICABILITY

As in the foregoing, the multicore fiber according to the present disclosure and the method of manufacture therefor are useful for an optical fiber having a plurality of core portions and for manufacture therefor.

REFERENCE SIGNS LIST

According to the present disclosure, it has an effect in that crosstalk between core portions is suppressed with a simple structure.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A multicore fiber comprising:
   multiple core portions arranged adjacent to each other such that every core portion of the multicore fiber is positioned adjacent to at least one other core portion to form a pair of two core portions adjacent to each other;
   a cladding portion formed around an outer periphery of the core portions; and
   holes provided in the cladding portion, each of the holes being arranged between a respective pair of two core portions adjacent to each other, wherein
   only one hole exists directly between the two core portions of every respective pair of two core portions of the multicore fiber adjacent to each other, and
   a distance between the only one hole and one of the two core portions in a respective pair differs from a distance between the only one hole and another of the two core portions in the respective pair.

2. The multicore fiber according to claim 1, wherein
   the core portions are arranged in an array, a plurality of the holes are provided for each of the core portions, and
   a distance between each of the plurality of the holes and the each of the core portions differs from a distance between the each of the plurality of the holes and the respective one of the core portions adjacent to the each of the core portions.

3. The multicore fiber according to claim 1, wherein the core portions includes core portions each being adjacent to N core portions, where N is an integer greater than two, and a number of the holes which are arranged around an outer periphery of each of the core portions is N or less.

4. The multicore fiber according to claim 3, wherein the N is six and one, two, or three of the holes are arranged around the outer periphery of each of the core portions.

5. The multicore fiber according to claim 1, wherein a cable cutoff wavelength of the core portions is 1530 nm or less.

6. The multicore fiber of claim 1, wherein:
   the multiple core portions comprises a central core portion and multiple peripheral core portions arranged around the central core portion such that each of the peripheral core portions is adjacent to the central core portion and approximately a same distance from the central core portion,
   the holes comprise multiple holes of equal number to the multiple peripheral core portions, wherein each hole is provided between the central core portion and a respective one of the peripheral core portions, and
   a first half of the number of multiple holes are equally spaced at a first distance from the central core portion, and a second half of the number of the multiple holes are equally spaced at a second distance from the central core portion, the first distance being different from the second distance.

* * * * *